United States Patent
Wei et al.

(10) Patent No.: US 10,206,118 B2
(45) Date of Patent: Feb. 12, 2019

(54) USER EQUIPMENT, CELLULAR NETWORK NODE AND METHOD FOR PROVIDING LICENSED-ASSISTED ACCESS

(71) Applicant: Sony Corporation, Tokyo (JP)

(72) Inventors: Na Wei, Beijing (CN); Wenbo Xu, Beijing (CN); Chu Wang, Beijing (CN); Jinpeng Zhang, Beijing (CN)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/753,125

(22) Filed: Jun. 29, 2015

(65) Prior Publication Data

US 2016/0212629 A1    Jul. 21, 2016

Related U.S. Application Data

(63) Continuation of application No. PCT/CN2015/071103, filed on Jan. 20, 2015.

(51) Int. Cl.
*H04W 16/18* (2009.01)
*H04W 72/06* (2009.01)
*H04W 72/10* (2009.01)

(52) U.S. Cl.
CPC .......... *H04W 16/18* (2013.01); *H04W 72/06* (2013.01); *H04W 72/10* (2013.01)

(58) Field of Classification Search
CPC .................................................... H04W 24/08
USPC ........................................................ 370/272
See application file for complete search history.

(56) References Cited

U.S. PATENT DOCUMENTS

| | | | |
|---|---|---|---|
| 8,532,599 B2 | 9/2013 | DiGirolamo et al. | |
| 2007/0298728 A1* | 12/2007 | Imamura | H04L 5/0046 455/77 |
| 2009/0161610 A1 | 6/2009 | Kang | |
| 2010/0265842 A1 | 10/2010 | Khandekar | |
| 2012/0250631 A1* | 10/2012 | Hakola | H04L 5/001 370/329 |
| 2013/0165134 A1 | 6/2013 | Touag | |
| 2015/0245232 A1* | 8/2015 | Luo | H04W 24/08 370/252 |

FOREIGN PATENT DOCUMENTS

| | | |
|---|---|---|
| CN | 102281502 | 12/2011 |
| CN | 102457863 A | 5/2012 |
| CN | 102457922 A | 5/2012 |
| EP | 2 675 205 A2 | 12/2013 |
| EP | 2 790 431 A1 | 10/2014 |
| EP | 3 111 581 | 1/2017 |

(Continued)

OTHER PUBLICATIONS

International Search Report for corresponding International Application No. PCT/CN2015/071103, dated Oct. 21, 2015.

(Continued)

*Primary Examiner* — Gary Lafontant
(74) *Attorney, Agent, or Firm* — Renner Otto Boisselle and Sklar

(57) ABSTRACT

A user equipment is operative to receive prioritization information for a plurality of unlicensed carriers from a cellular network node and to use the prioritization information for channel measurements or carrier selection.

18 Claims, 10 Drawing Sheets

(56) References Cited

FOREIGN PATENT DOCUMENTS

| GB | 2 266 433 | 10/1993 |
|----|-----------|---------|
| WO | WO 2012/024346 | 8/2011 |
| WO | WO 2012/046999 | 10/2011 |
| WO | 2012/024346 A1 | 2/2012 |
| WO | 2014/012453 A1 | 1/2014 |

OTHER PUBLICATIONS

R1-144628, "Other functionalities for LAA", CATT, 3GPP TSG RAN WG1 Meeting #79, Nov. 21, 2014, San Francisco, CA, USA.
R1-144702, "Channel Selection for Licensed-Assisted Access", Al-catel-Lucent Shanghai Bell, 3GPP TSG RAN WG1 Meeting #79, Nov. 21, 2014, San Francisco, CA, USA.
R1-144740, "Discussion on carrier selection for LAA", Samsung, 3GPP TSG RAN WG1 Meeting #79, Nov. 21, 2014, San Francisco, CA, USA.
R1-144826, "Potential solutions to obtain unlicensed spectrum", ZTE, 3GPP TSG RAN WG1 Meeting #79, Nov. 21, 2014, San Francisco, CA, USA.
R1-144940, "Discussion on possible solutions for LAA", CMCC, 3GPP TSG RAN WG1 Meeting #79, Nov. 21, 2014, San Francisco, CA, USA.
R1-145127, "Avoiding hidden node problem by pseudo signaling from eNB perspective", Institute for Information Industry (III), 3GPP TSG RAN WG1 Meeting #79, Nov. 21, 2014, San Francisco, CA, USA.
Supplementary European Search Report for corresponding European Application No. 15878356.3.
Office action dated Mar. 13, 2018 in corresponding Japanese application No. JP2018506901A (and English translation).

\* cited by examiner

USER EQUIPMENT, CELLULAR NETWORK NODE AND METHOD FOR PROVIDING LICENSED-ASSISTED ACCESS

FIELD OF THE INVENTION

Embodiments of the invention relate to wireless communication. Embodiments of the invention relate in particular to Licensed-Assisted Access (LAA) for unlicensed spectrum.

BACKGROUND OF THE INVENTION

With increasing popularity of mobile voice and data communication, there is an ever increasing demand for high-speed voice and data communication. The licensed spectrum for cellular communication is rapidly being exhausted by a dense and growing subscriber base. This applies in particular to the valuable low-frequency bands with low propagation loss traits.

A significant amount of unlicensed spectrum is available. For illustration, a significant amount of spectrum is globally available in the 5 GHz band. It is desirable to utilize the unlicensed spectrum, e.g. the LTE-unlicensed (LTE-U) spectrum, to augment the capacity of licensed frequency carriers. The unlicensed spectrum may be used for carrying data traffic for mobile services. The purpose of unlicensed spectrum usage is to extend cellular communication to unlicensed spectrum.

Carrier aggregation may be performed in which usage of unlicensed spectrum and licensed spectrum is combined. The licensed carrier may be a primary carrier, e.g. a LTE licensed carrier. The unlicensed carriers may be secondary carriers to which data traffic may be offloaded in the downlink or both in the uplink and in the downlink.

In Licensed-Assisted Access (LAA), transmissions on carriers of the licensed spectrum may be used for assisting unlicensed spectrum access. For illustration, LTE-U data transmissions may still be controlled by a primary carrier in the licensed spectrum.

Different challenges must be met in LAA. For illustration, interference with non-cellular technologies or with other secondary cells may make it necessary that an unlicensed carrier is reconfigured frequently. Signalling overheads associated with interference detection and carrier selection in the unlicensed band may be high, which reduces efficiency and increases network loads.

Further, there may be a potentially large number of carriers in the unlicensed band which the eNodeB may need to handle. The handling of such a large number of carriers may increase system complexity.

BRIEF SUMMARY OF THE INVENTION

There is a continued need in the art for devices, systems and methods which mitigate at least some of the above shortcomings. There is a need for devices, systems and methods which provide licensed-assisted access (LAA) to unlicensed spectrum while mitigating signalling overhead problems associated with avoiding interference with other non-cellular devices and/or with other secondary cells. There is a need for devices, systems and methods which provide LAA to unlicensed spectrum while keeping complexity moderate.

According to embodiments, there are provided devices, systems and methods in which a user equipment of a cellular communication network is operative to receive prioritization information on a plurality of unlicensed carriers from a cellular network node. The user equipment may use the prioritization information for selectively adapting channel measurements for unlicensed carriers based on the prioritization information. Alternatively or additionally, the user equipment may use the prioritization information for autonomously switching to another unlicensed carrier in accordance with the prioritization information.

The cellular network node may receive measurement reports provided by one or several user equipments for unlicensed carriers. The cellular network node may use the measurement reports provided by user equipments, optionally in combination with interference measurements for unlicensed carriers performed by the cellular network node itself, to assign user equipments to groups.

The LAA may be implemented on a group level in which the cellular network node may control the usage of unlicensed carriers of a group by a multicast message.

A user equipment according to an embodiment comprises a wireless interface operative for communication with a cellular communication network. The user equipment is operative to receive prioritization information for a plurality of unlicensed carriers from a cellular network node. The user equipment is operative to use the prioritization information for channel measurements or carrier selection.

The prioritization information may be included in a broadcast message.

The prioritization information may be included in a system information block. The system information block may define which ones of several unlicensed carriers have higher priority and which ones of several unlicensed carriers have lower priority for channel measurements and/or channel switching.

The prioritization information may define a first set of unlicensed carriers and a second set of unlicensed carriers which is different from the first set of unlicensed carriers. The user equipment may be operative to perform channel measurements for at least one carrier of the first set of unlicensed carriers. The user equipment may be operative to, in response to detecting a trigger event, start performing channel measurements for at least one carrier of the second set of unlicensed carriers. Thereby, channel measurements for the second set of unlicensed carriers may be delayed until after the trigger event. Network loads and complexity may be reduced.

The first set of unlicensed carriers and the second set of unlicensed carriers may be disjoint.

The user equipment may be operative to start reporting the channel measurements for the at least one carrier of the second set of unlicensed carriers in response to detecting the trigger event.

The user equipment may be operative to perform the channel measurements only for one or several unlicensed carriers in the first set of unlicensed carriers before the trigger event is detected.

The user equipment may be operative to perform the channel measurements for one or several unlicensed carriers in the second set of unlicensed carriers after the trigger event is detected, alone or in combination with the channel measurement for unlicensed carriers in the first set.

The channel measurements may comprise measurements of one or several of received (RX) power, noise or other parameters which indicate interference on an unlicensed carrier.

The channel measurements may comprise measurements which identify competing, non-cellular usage of the unlicensed carrier(s) for which the measurements are performed.

The user equipment may be operative such that the trigger event is configured in the user equipment by the cellular network node.

The trigger event may depend on characteristics of the first set of unlicensed carriers.

The trigger event may comprise a threshold comparison of a number of carriers in the first set of unlicensed carriers which are available for communication. To detect the trigger event, the user equipment may compare a number of active carriers in the first set of unlicensed carriers to a threshold and may start performing the channel measurements for carriers of the second set when the number of active carriers in the first set of unlicensed carriers reaches or falls below the threshold. To detect the trigger event, the user equipment may identify a number of carriers in the first set of unlicensed carriers for which there is no or only low interference, and may compare this number of carriers to a threshold and may start performing the channel measurements for carriers of the second set when the number of active carriers in the first set of unlicensed carriers reaches or falls below the threshold.

The trigger event may comprise receipt of a trigger message.

The trigger message may be a multicast or broadcast message from the cellular network node.

The user equipment may be operative to receive the trigger message over a licensed carrier.

The user equipment may be operative to report results of the channel measurements performed for unlicensed carriers to the cellular network node over a licensed carrier.

The user equipment may be operative to use the priority information to select an active carrier from the plurality of unlicensed carriers.

The priority information may define a sequence in which the unlicensed carriers are used by the user equipment for communication.

The user equipment may be operative to use the priority information for carrier re-selection.

The carrier reselection may be triggered by a message from the cellular network node which indicates that the cellular network node will enter a discontinuous transmission (DTX) mode.

The user equipment may be operative to transmit information on the selected carrier to the cellular communication network.

The user equipment may be operative to transmit the information on the selected carrier over a licensed carrier.

The cellular network node may determine the prioritization information based on channel measurements performed by the cellular network node for the plurality of unlicensed carriers and/or based on historical channel measurements reported by user equipments.

The user equipment may be operative to receive group information from the cellular network node, the group information assigning the user equipment to a group of user equipments. The user equipment may be operative to switch an active carrier selected from the plurality of unlicensed carriers in response to a multicast message from the cellular communication network. A LAA carrier switching procedure may be implemented thereby which can be implemented using multicast messages, thereby reducing signalling overhead.

According to a further embodiment, a user equipment comprises a wireless interface operative for communication with a cellular communication network. The user equipment is operative to receive group information from a cellular network node, the group information assigning the user equipment to at least one group of user equipments of the cellular communication network. The user equipment may be operative to switch an active carrier selected from the plurality of unlicensed carriers in response to a multicast message from the cellular communication network which instructs the group of user equipments to switch the active carrier.

Carrier switching, e.g. due to carrier activation or deactivation, may be implemented thereby in a group-wise manner. A LAA carrier switching procedure may be implemented thereby which can be implemented using multicast messages, thereby reducing signalling overhead.

The cellular network node may assign different user equipments to one or several groups, depending on channel measurements reported by the user equipments. Channel measurements performed by the cellular network node itself may also be taken into consideration when assigning user equipments to groups.

User equipments may thereby be assigned to groups in dependence on the actual interference detected by the user equipments. Such interference may be caused by other secondary cells (SCells) or non-cellular communication devices.

In response to a multicast message from the cellular network node, the user equipment may determine whether an indication of a group included in the multicast message matches a group to which the user equipment is assigned. If the multicast message indicates the group to which the user equipment is assigned, the user equipment may be operative to switch to another unlicensed carrier, for example, or to stop using an unlicensed carrier.

A cellular network node according to an embodiment comprises a wireless interface for communication with a user equipment and a processing device coupled to the wireless interface and operative to control the wireless interface to transmit prioritization information on a plurality of unlicensed carriers to at least one user equipment.

The prioritization information may define a first set of unlicensed carriers and a second set of unlicensed carriers which is different from the first set of unlicensed carriers.

The cellular network node may be operative to pre-configure a trigger event in the at least one user equipment, the trigger event causing the at least one user equipment to start performing channel measurements for at least one carrier of the second set of unlicensed carriers.

The cellular network node may be operative to define the first set of unlicensed carriers and the second set of unlicensed carriers based on channel measurements performed by the cellular network node and/or based on channel measurements performed by the user equipment.

The prioritization information may define a sequence in which the user equipment shall use the unlicensed carriers. The cellular network node may be operative to set the sequence based on channel measurements performed by the cellular network node and/or based on channel measurements performed by the user equipment.

The cellular network node may be operative to assign the at least one user equipment to a group of user equipments and to transmit a multicast message to cause all user equipments of the group to switch to another unlicensed carrier.

According to a further embodiment, a cellular network node comprises a wireless interface for communication with a user equipment and a processing device coupled to the wireless interface. The processing device may be operative to assign the at least one user equipment to a group of user equipments. The cellular network node may be operative to transmit a multicast message to cause all user equipments of the group to switch to another unlicensed carrier.

The cellular network node may be operative to assign user equipments to groups based on channel measurements reported by the user equipments and/or based on channel measurements performed by the cellular network node itself.

A system according to an embodiment comprises a cellular network node according to an embodiment and a user equipment according to an embodiment.

A method of using unlicensed carriers for a cellular communication network according to an embodiment comprises receiving, by a user equipment, prioritization information for a plurality of unlicensed carriers from a cellular network node. The method comprises using, by the user equipment, the prioritization information for channel measurements or carrier selection.

The prioritization information may define a first set of unlicensed carriers and a second set of unlicensed carriers which is different from the first set of unlicensed carriers. Using the prioritization information for channel measurements may comprise performing channel measurements for at least one carrier of the first set of unlicensed carriers; and in response to detecting a trigger event, starting channel measurements for at least one carrier of the second set of unlicensed carriers.

The method may be performed by a user equipment or a system according to an embodiment.

In the method, the prioritization information may be included in a broadcast message.

In the method, the prioritization information may be included in a system information block. The system information block may define which ones of several unlicensed carriers have higher priority and which ones of several unlicensed carriers have lower priority for channel measurements and/or channel switching.

In the method, the user equipment may start reporting the channel measurements for the at least one carrier of the second set of unlicensed carriers in response to detecting the trigger event.

In the method, the user equipment may perform the channel measurements only for one or several unlicensed carriers in the first set of unlicensed carriers before the trigger event is detected.

In the method, the user equipment may perform the channel measurements for one or several unlicensed carriers in the second set of unlicensed carriers after the trigger event is detected, alone or in combination with the channel measurement for unlicensed carriers in the first set.

In the method, the channel measurements may comprise measurements of one or several of received (RX) power, noise or other parameters which indicate interference on an unlicensed carrier.

In the method, the channel measurements may comprise measurements which identify competing, non-cellular usage of the unlicensed carrier(s) for which the measurements are performed.

In the method, the user equipment may be operative such that the trigger event is configured in the user equipment by the cellular network node.

In the method, the trigger event may depend on characteristics of the first set of unlicensed carriers.

In the method, the trigger event may comprise a threshold comparison of a number of carriers in the first set of unlicensed carriers which are available for communication. To detect the trigger event, the user equipment may compare a number of active carriers in the first set of unlicensed carriers to a threshold and may start performing the channel measurements for carriers of the second set when the number of active carriers in the first set of unlicensed carriers reaches or falls below the threshold. To detect the trigger event, the user equipment may identify a number of carriers in the first set of unlicensed carriers for which there is no or only low interference, and may compare this number of carriers to a threshold and may start performing the channel measurements for carriers of the second set when the number of active carriers in the first set of unlicensed carriers reaches or falls below the threshold.

In the method, the trigger event may comprise receipt of a trigger message.

In the method, the trigger message may be a multicast or broadcast message from the cellular network node.

In the method, the user equipment may receive the trigger message over a licensed carrier.

In the method, the trigger event may be pre-configured in the at least one user equipment by the cellular network node.

In the method, the user equipment may report results of the channel measurements performed for unlicensed carriers to the cellular network node over a licensed carrier.

In the method, the user equipment may use the priority information to select an active carrier from the plurality of unlicensed carriers.

In the method, the priority information may define a sequence in which the unlicensed carriers are used by the user equipment for communication.

In the method, the user equipment may use the priority information for carrier re-selection.

The carrier reselection may be triggered by a message from the cellular network node which indicates that the cellular network node will enter a discontinuous transmission (DTX) mode.

In the method, the user equipment may transmit information on the selected carrier to the cellular communication network.

In the method, the user equipment may transmit the information on the selected carrier over a licensed carrier.

In the method, the cellular network node may determine the prioritization information based on channel measurements performed by the cellular network node for the plurality of unlicensed carriers and/or based on historical channel measurements reported by user equipments.

In the method, the user equipment may receive group information from the cellular network node, the group information assigning the user equipment to a group of user equipments. The user equipment may switch an active carrier selected from the plurality of unlicensed carriers in response to a multicast message from the cellular communication network. A LAA carrier switching procedure may be implemented thereby which can be implemented using multicast messages, thereby reducing signalling overhead.

The method may comprise assigning, by the cellular network node, the user equipment to a group of user equipments based on channel measurements performed by the user equipment and/or by the cellular network node.

According to a further embodiment, a method comprises receiving, by a user equipment, group information from a cellular network node, the group information assigning the user equipment to at least one group of user equipments of the cellular communication network. The method may comprise switching, by the user equipment, an active carrier selected from a plurality of unlicensed carriers in response to a multicast message from the cellular communication network which instructs the group of user equipments to switch the active carrier.

Carrier switching, e.g. due to carrier activation or deactivation, may be implemented thereby in a group-wise manner. A LAA carrier switching procedure may be implemented thereby which can be implemented using multicast messages, thereby reducing signalling overhead.

In the method, the cellular network node may assign different user equipments to one or several groups, depending on channel measurements reported by the user equipments. Channel measurements performed by the cellular network node itself may also be taken into consideration when assigning user equipments to groups.

In the method, user equipments may thereby be assigned to groups in dependence on the actual interference detected by the user equipments. Such interference may be caused by other secondary cells (SCells) or non-cellular communication devices.

The method may comprise determining, by the user equipment, whether an indication of a group included in the multicast message matches a group to which the user equipment is assigned. If the multicast message indicates the group to which the user equipment is assigned, the user equipment may be operative to switch to another unlicensed carrier, for example, or to stop using an unlicensed carrier.

The cellular network node may be an eNodeB.

In the devices, systems, and methods according to embodiments, the unlicensed frequency band may be a portion of a radio spectrum which is not licensed to any operator of a cellular communication network.

In the devices, systems, and methods according to embodiments, the unlicensed frequency band may be the 5 GHz band or may comprise at least one subband of the 5 GHz band.

Devices, systems and methods according to embodiments mitigate signalling overhead problems for LAA. Devices, systems and methods according to embodiments also allow a unlicensed carriers to be prioritized, thereby reducing the number of unlicensed carriers which must be dealt with simultaneously. Devices, systems and methods according to embodiments allow LAA to be implemented in a group-wise manner. Complexity may be reduced thereby.

BRIEF DESCRIPTION OF THE DRAWINGS

Embodiments of the invention will be described with reference to the accompanying drawings in which the same or similar reference numerals designate the same or similar elements.

DESCRIPTION OF EMBODIMENTS

Exemplary embodiments of the invention will be described with reference to the drawings. While some embodiments will be described in the context of specific fields of application, e.g. in the context of certain spectral ranges and communication techniques, the embodiments are not limited to this field of application. The features of the various embodiments may be combined with each other unless specifically stated otherwise.

Figure 1:
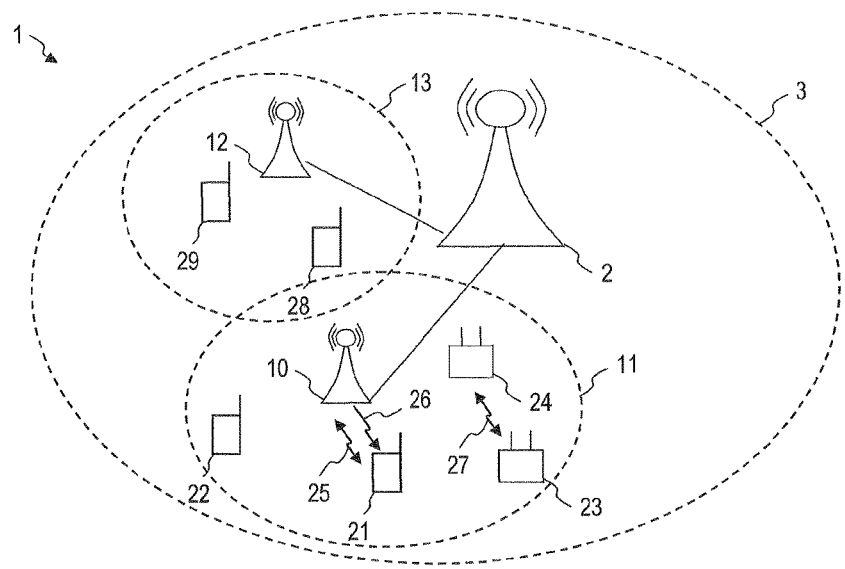
FIG. 1 is a schematic view of a communication system according to an embodiment.

FIG. 1 is a schematic view of a communication system 1 according to an embodiment. The communication system 1 illustrates one of various possible exemplary scenarios in which transmissions in Long Term Evolution (LTE)-unlicensed (LTE-U) frequency bands may be employed. A cellular communication network has a radio access network (RAN) having a base station 2. The base station 2 may serve a macro cell 3. There may be one or several smaller operator deployed cell(s) 11, 13. The cell(s) 11, 13 may be small cells or secondary cells (SCells). An eNodeB 10, 12 may be deployed by an operator of the cellular communication network for serving the cell 11, 13. The cell 11, 13 of the cellular communication network may support a transmission of the LTE traffic data both in licensed frequency bands which are licensed to the operator of the cellular communication network and in unlicensed frequency bands. The unlicensed frequency bands may be LTE-U frequency bands.

The unlicensed frequency bands which may be used for transmissions on unlicensed carriers may be frequency bands which are not licensed to any cellular network operator. The unlicensed frequency bands may include at least some subbands of the 5 GHz band, for example. The unlicensed frequency bands may include a frequency band from 5150 MHz to 5350 MHz, which is a subband of the 5 GHz band. Alternatively or additionally, the unlicensed frequency bands may include a frequency band from 5150 MHz to 5250 MHz, which is another subband of the 5 GHz band. Alternatively or additionally, the unlicensed frequency bands may include a frequency band from 5250 MHz to 5350 MHz, which is another subband of the 5 GHz band. Alternatively or additionally, the unlicensed frequency bands may include a frequency band from 5470 MHz to 5725 MHz, which is another subband of the 5 GHz band.

Any one of various deployment options may be used for aggregating unlicensed spectrum to a licensed carrier to augment capacity. In a Supplemental Downlink (SDL) mode of operation, the unlicensed spectrum may be utilized only for the downlink to augment capacity and increase data rates in a heavily trafficked downlink. In a Carrier Aggregation (CA) mode of operation allows use of unlicensed spectrum in both the downlink and uplink. The CA mode allows the amount of unlicensed spectrum resource that can be allocated for uplink or downlink to be adjusted.

FIG. 1 exemplarily illustrates a SDL mode of operation. Downlink (DL) and uplink (UL) control signalling and data traffic may be transmitted in the licensed carrier frequencies by radio signals 25. At least DL traffic may be transmitted from the eNodeB 10 to a user equipment 21 of the cellular network in a radio signal 26 on an unlicensed carrier. The radio signal 26 may have a frequency in the LTE-U frequency band.

Offloading data traffic to the unlicensed frequency bands may be performed selectively for only some of the user equipments in the cell 11. For illustration, the eNodeB 10 may perform LTE-U data transmissions for DL traffic to the user equipment 21, but may not perform LTE-U offloading for another user equipment 22.

The unlicensed frequency bands may also be co-utilized by one or several devices 23, 24 which are not under a control of a cellular network operator. Examples for such devices 23, 24 include Wi-Fi devices or WLAN access points. The presence of such device 23, 24 which are operative to transmit in an unlicensed frequency band which is intended to be used for LTE-U data transmissions may lead to interference problems. For illustration, the eNodeB will not be able to transmit in a radio resource which is used by one or several of the devices 23, 24. Transmissions 27 between the devices 23, 24 may have a frequency in the unlicensed frequency bands and are prone to causing interference with a LTE-U data transmission, for example.

Additionally or alternatively, unlicensed frequency bands may also be co-utilized by another SCell 13 in which user equipments 28, 29 are located.

As will be explained in more detail below, user equipments may be grouped in accordance with channel measurements which are performed by the user equipments. Channel measurements performed by the eNodeB may optionally also be taken into account. Thereby, user equipment experiencing interference in the similar or identical unlicensed carriers may be grouped together to implement a group-wise control which may be implemented by multicast messages. The grouping is based on the actual measured interference rather than being based on location of user equipments only.

User equipments and cellular network nodes may be operative in such a way that channel measurements may be delayed for at least some unlicensed carriers. The eNodeB or another cellular network node may organize unlicensed carriers into different sets. For illustration, a first set including higher priority unlicensed carriers and a second set including lower priority unlicensed carriers may be defined. The cellular network node may determine based on interference measured by the cellular network node itself or based on historical interference measurements of user equipments which unlicensed carriers should be included in the first set, because they are less prone to exhibiting interference issues than other unlicensed carriers. User equipments may limit the channel measurements to the unlicensed carriers in the first set until a trigger event occurs. In response to the trigger event, user equipments may start performing channel measurements for one or several unlicensed carriers in the second set. Signalling overheads may be kept small, and the number of unlicensed carriers which must be handled by the eNodeB may be kept moderate.

The channel measurements may include any one or any combination of RX power, noise measurements or other measurements which quantify usage of an unlicensed carrier by another SCell or by non-cellular devices.

User equipments and cellular network nodes may be operative in such a way that a user equipment may autonomously switch to another unlicensed carrier. This allows the switching to be implemented with small signalling overhead.

Figure 2:
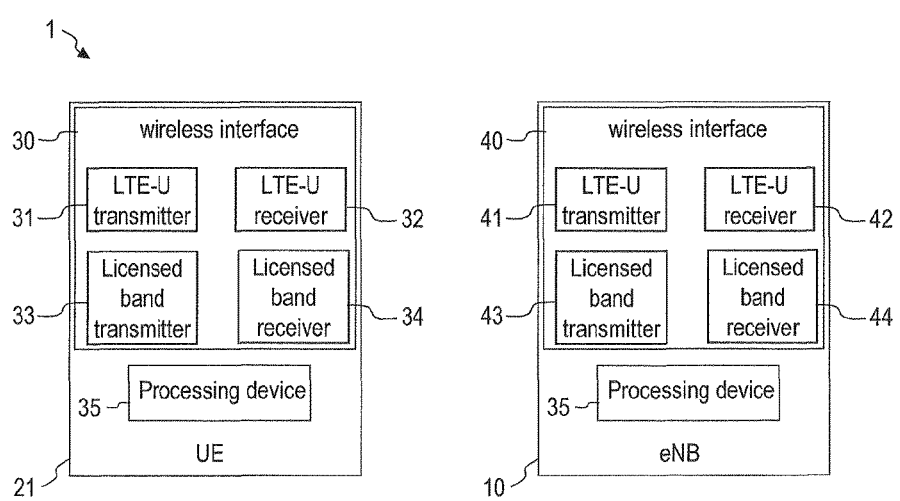
FIG. 2 is a block diagram of a communication system according to an embodiment.

FIG. 2 is a diagram of a communication system 1 according to an embodiment. The communication system 1 comprises a user equipment 21 according to an embodiment and a cellular network node configured as eNodeB 10 according to an embodiment.

The user equipment 21 comprises a wireless interface 30. The wireless interface 30 may be operative to transmit and receive data over an eUTRA air interface. The wireless interface 30 may comprise transmitter circuitry 33 and receiver circuitry 34 for signals having frequencies in a licensed band.

The wireless interface 30 may comprise a LTE-U transmitter 31. The LTE-U transmitter 31 is operative to transmit signal on an unlicensed carrier. The LTE-U transmitter 31 may be operative to use radio resources from a LTE-U frequency band which are not licensed to any cellular network operator for transmitting traffic or control data. The LTE-U transmitter 31 may be operative to perform a modulation to generate radio signals having a frequency in a frequency band which is not licensed to any cellular network operator. While the LTE-U transmitter 31 is shown as a separate block in FIG. 2, the LTE-U transmitter 31 and the licensed band transmitter 33 may be integrally formed. The LTE-U transmitter 31 and the licensed band transmitter 33 may share at least some signal processing circuitry. While the LTE-U receiver 32 is shown as a separate block in FIG. 2, the LTE-U receiver 32 and the licensed band receiver 34 may be integrally formed. The LTE-U receiver 32 and the licensed band receiver 34 may share at least some signal processing circuitry.

The wireless interface 30 may comprise a LTE-U receiver 32. The LTE-U receiver 32 may be operative to perform demodulation for signals having a frequency of an unlicensed carrier. The LTE-U receiver 32 may be operative to demodulate radio signals having a frequency in a frequency band which is not licensed to any cellular network operator.

The user equipment 21 may have a processing device 35. The processing device 35 may comprise at least one integrated circuit. The processing device 35 may comprise a controller, a microcontroller, a processor, a microprocessor, an application specific integrated circuit (ASIC) or a combination thereof. The processing device 35 may be operative to monitor, via the LTE-U receiver 32, whether other communication devices use radio resources in unlicensed spectrum. The processing device 35 may be operative to perform channel measurements, such as RX power, noise or other measurements, to quantify the degree to which other devices use one or several unlicensed carriers.

The processing device 35 may be operative to process prioritization information received from the eNodeB. The processing device 35 may be operative to process prioritization information which is received over a licensed carrier. The prioritization information may be included in a system information block (SIB) transmitted by the eNodeB 10.

The processing device 35 may be operative to retrieve a configuration of unlicensed carriers from a SIB received by the licensed band receiver 34. The configuration may include information on carrier frequencies for a plurality of unlicensed carriers.

The processing device 35 may be operative to retrieve the prioritization information from the same SIB or another SIB. The prioritization information may be used as static or semi-static information by the user equipment 21. The user equipment 21 may store the prioritization information.

The prioritization information may have any one of a variety of formats. The prioritization information may define a first set and a second set of unlicensed carriers. Additional sets of unlicensed carriers may optionally be defined. The prioritization information may define, for each one of the plurality of carriers, whether the carrier is included in the first set or in the second set. This may be done in various ways, e.g. by indicating the set on a carrier-by-carrier basis for each one of the plurality of unlicensed carriers or by grouping carrier identifiers depending on the set to which the respective unlicensed carriers are assigned.

In operation of the user equipment 21, the processing device 35 may use the prioritization information for delayed channel measurements. The user equipment 21 may limit channel measurements, e.g. RX power or noise measurements, to unlicensed carriers in the first set of unlicensed carriers until a trigger event is detected. In response to the trigger event, the processing device 35 may perform channel measurements for one or several unlicensed carriers in the second set of unlicensed carriers.

The trigger event may be pre-configured. The trigger event may be configured by the eNodeB 10. The trigger event may be configured by the eNodeB 10 in a multicast message, for example. Different trigger events may be used. For illustration, the trigger event may be that a certain unlicensed carrier is configured, deconfigured, activated or deactivated by the eNodeB 10.

The trigger event may be that a number of active unlicensed carriers in the first set is less than a threshold. The threshold may be configured by the eNodeB 10.

The trigger event may be that the number of unlicensed carriers in the first list is less than a threshold and/or that the number of unlicensed carriers in the first list for which no interference from another SCell or a non-cellular device is detected is less than the threshold. The threshold may be configured by the eNodeB 10.

The trigger event may be receipt of a trigger message from the eNodeB 10. The trigger message may be a multicast or broadcast message which indicates a group identifier for a group to which the eNodeB 10 has assigned the user equipment 21.

Alternatively or additionally to defining different sets of unlicensed carriers for delayed channel measurements, the prioritization information may define a sequence in which the unlicensed carriers are to be used by the user equipment 21. The user equipment 21 may switch the unlicensed carrier in accordance with the prioritization information. The user equipment 21 may perform the carrier switching autonomously. The user equipment 21 may perform the carrier switching without obtaining prior authorization from the eNodeB 10. A decision on which unlicensed carrier to use may be made by the processing device 35 in accordance with the prioritization information.

The user equipment 21 may receive the prioritization information which defines a sequence in which the unlicensed carriers are to be used together with the configuration information for the carriers or in a separate SIB, for example. The user equipment 21 may receive the prioritization information which defines a sequence in which the unlicensed carriers are to be used over a licensed carrier.

The processing device 35 may control the user equipment 21 to transmit to the eNodeB 10 information which indicates that the user equipment 21 has autonomously switched the unlicensed carrier, e.g. by using a new active unlicensed carrier. The processing device 35 may control the licensed band transmitter 33 to transmit this information to the eNodeB 10.

For illustration, when the processing device 35 detects that a current active unlicensed carrier experiences interference above a certain threshold for a certain duration, the user equipment 21 may autonomously switch to the unlicensed carrier which is the next in accordance with the prioritization information. The user equipment 21 may inform the eNodeB 10 of the carrier switching by transmitting information in a licensed carrier in the uplink.

For further illustration, when the eNodeB 10 wants to enter a DTX state in a certain unlicensed carrier, it will inform UE 21. The UE 21 will switch to the unlicensed carrier which is the next in accordance with the prioritization information.

Irrespective of whether the prioritization information is used for delayed channel measurements and/or for carrier switching and/or for other purposes, the user equipment 21 may receive updated prioritization information. The eNodeB 10 may update the prioritization of unlicensed carriers based on channel measurements performed by the user equipment 21 and/or by the eNodeB 10. Updated prioritization information may be received by the user equipment 21 over a license carrier.

The eNodeB 10 comprises a wireless interface 40. The wireless interface 40 may be operative to transmit and receive data over an eUTRA air interface. The wireless interface 40 may comprise transmitter circuitry 43 and receiver circuitry 44 for signals having frequencies in a licensed band.

The wireless interface 40 may comprise a LTE-U transmitter 41. The LTE-U transmitter 41 is operative to transmit signal on an unlicensed carrier. The LTE-U transmitter 41 may be operative to use radio resources from a LTE-U frequency band which are not licensed to any cellular network operator for transmitting traffic or control data. The LTE-U transmitter 41 may be operative to perform a modulation to generate radio signals having a frequency in a frequency band which is not licensed to any cellular network operator. While the LTE-U transmitter 41 is shown as a separate block in FIG. 2, the LTE-U transmitter 41 and the licensed band transmitter 43 may be integrally formed. The LTE-U transmitter 41 and the licensed band transmitter 43 may share at least some signal processing circuitry. While the LTE-U receiver 42 is shown as a separate block in FIG. 2, the LTE-U receiver 42 and the licensed band receiver 44 may be integrally formed. The LTE-U receiver 42 and the licensed band receiver 44 may share at least some signal processing circuitry.

The wireless interface 40 may comprise a LTE-U receiver 42. The LTE-U receiver 42 may be operative to perform demodulation for signals having a frequency of an unlicensed carrier. The LTE-U receiver 42 may be operative to demodulate radio signals having a frequency in a frequency band which is not licensed to any cellular network operator.

The eNodeB 10 may have a processing device 45. The processing device 45 may comprise at least one integrated circuit. The processing device 45 may comprise a controller, a microcontroller, a processor, a microprocessor, an application specific integrated circuit (ASIC) or a combination of several such integrated circuits. The processing device 45 may be operative to monitor, via the LTE-U receiver 42, whether other communication devices use radio resources in unlicensed spectrum. The processing device 45 may be operative to perform channel measurements, such as RX power, noise or other measurements, to quantify the degree to which other devices use one or several unlicensed carriers.

The processing device 45 may be operative to generate prioritization information for transmission to one or several user equipments. The processing device 45 may be operative to generate the prioritization information based on channel measurements for unlicensed band carriers performed by the eNodeB 10 via the LTE-U receiver 42.

The processing device 45 may be operative to generate the prioritization information based on channel measurements performed for unlicensed carriers by one or several user equipments. The channel measurements results may be received at the eNodeB 10 over licensed carriers from the user equipments. For illustration, the processing device 45 may identify unlicensed carriers to have higher priorities for which the eNodeB 10 and/or the user equipments detected low interference over time. The processing device 45 may identify unlicensed carriers to have lower priorities for which the eNodeB 10 and/or the user equipments detected low interference over time. The interference may come from other SCells or from non-cellular devices.

The processing device 45 may determine different prioritization of unlicensed carriers for different user equipments. For illustration, for a group of user equipments which reported significant interference for some unlicensed carriers, the priorities of these unlicensed carriers may be set to be low by the processing device 45. For another group of user equipments for which the interference on the same unlicensed carriers was not as high, the eNodeB 10 may assign higher priorities to these same unlicensed carriers.

The eNodeB 10 may be operative to transmit the prioritization information over a licensed carrier. The prioritization information may be included in a system information block (SIB) transmitted by the eNodeB 10. The eNodeB 10 may additionally transmit information on a configuration of the unlicensed carriers. The configuration information may include information on carrier frequencies for a plurality of unlicensed carriers. The processing device 45 may be operative to transmit the prioritization information in the same SIB in which the configuration of the carriers is defined. The processing device 45 may be operative to transmit the prioritization information in another SIB than the one in which the configuration of the unlicensed carriers is defined. The prioritization information may be a static or semi-static information variable.

The prioritization information generated and transmitted by the eNodeB 10 may have any one of a variety of formats. The prioritization information may be generated by the eNodeB 10 such that it defines a first set and a second set of unlicensed carriers. Additional sets of unlicensed carriers may optionally be defined. The prioritization information may be generated by the eNodeB 10 such that it defines, for each one of the plurality of carriers, whether the carrier is included in the first set or in the second set. This may be done in various ways, e.g. by indicating the set on a carrier-by-carrier basis for each one of the plurality of unlicensed carriers or by grouping carrier identifiers depending on the set to which the respective unlicensed carriers are assigned.

The eNodeB 10 may be configured to pre-configure a trigger event in at least one user equipment 2. The trigger event may be configured by the eNodeB 10 in a multicast message, for example. Different trigger events may be used. For illustration, the trigger event may be that a certain unlicensed carrier is configured, deconfigured, activated or deactivated by the eNodeB 10.

The trigger event may be that a number of active unlicensed carriers in the first set is less than a threshold. The threshold may be configured by the eNodeB 10.

The trigger event may be that the number of unlicensed carriers in the first list is less than a threshold and/or that the number of unlicensed carriers in the first list for which no interference from another SCell or a non-cellular device is detected is less than the threshold. The threshold may be configured by the eNodeB 10.

The trigger event may be receipt of a trigger message from the eNodeB 10. The trigger message may be a multicast or broadcast message which indicates a group identifier for a group to which the eNodeB 10 has assigned the user equipment 21. The eNodeB 10 may then be operative to transmit the trigger message when the eNodeB intends the user equipment 2 to start performing channel measurements for low priority carriers.

Alternatively or additionally to defining different sets of unlicensed carriers for delayed channel measurements, the prioritization information may define a sequence in which the unlicensed carriers are to be used by the user equipment 21.

The eNodeB 10 may generate the prioritization information such that it defines a sequence in which the unlicensed carriers are to be used. The eNodeB 10 may transmit the prioritization information together with the configuration information for the carriers or in a separate SIB, for example. The eNodeB 10 may transmit the prioritization information which defines a sequence in which the unlicensed carriers are to be used over a licensed carrier.

The eNodeB 10 may be operative to receive over a licensed band information which indicates that the user equipment 21 has autonomously switched the unlicensed carrier, e.g. by using a new active unlicensed carrier. For illustration, when the user equipment 21 experiences interferences for an unlicensed carrier which is being used, the user equipment 21 may autonomously switch to the unlicensed carrier which is the next in accordance with the prioritization information and may inform the eNodeB 10 of the carrier switching by transmitting information in a licensed carrier in the uplink. The eNodeB 10 may adjust the processing of signals received at the LTE-U receiver 42 accordingly.

For further illustration, when the eNodeB 10 wants to enter a DTX state in a certain unlicensed carrier, it will inform UE 21 thereof. The eNodeB 10 may transmit a signal on a licensed carrier to indicate that the eNodeB 10 wants to enter the DTX state in a certain unlicensed carrier.

Irrespective of whether the prioritization information is used for delayed channel measurements and/or for carrier switching and/or for other purposes, the eNodeB 10 may process channel measurements performed by the eNodeB 10 itself for unlicensed carriers and/or channel measurements reported by user equipments. The channel measurements may be processed by the processing device 45 to determine whether the prioritization information is to be updated. Updated prioritization information may be broadcast in a SIB, for example.

The processing device 45 of the eNodeB 10 may perform additional functions. For illustration, and as will be explained in more detail herein, the processing device 45 may assign user equipments to different groups. LAA may be implemented in a group-wise fashion. Assigning user equipments to different groups may be performed based on channel measurements reported by user equipments for different unlicensed carriers. User equipments detecting interference in the same unlicensed carriers may be assigned to the same group. Grouping may thus be based on channel measurements, independently of the locations of the user equipments.

The eNodeB 10 may use multicast messages for implementing LAA in a group-wise manner. For illustration, a multicast message indicating a desired carrier switching between unlicensed carriers may indicate a group identifier. All user equipments belonging to the group having this group identifier may switch the carrier in accordance with the multicast message. Similar group-wise control may be used for activation, deactivation, configuration and deconfiguration of unlicensed carriers under the control of the eNodeB 10.

Figure 3:
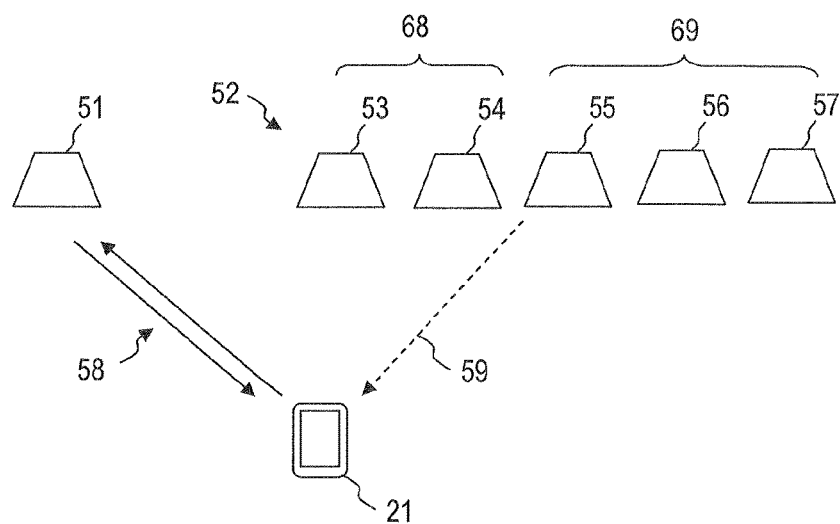
FIG. 3 shows a utilization of unlicensed carriers in a method and system according to an embodiment.

FIG. 3 illustrates a scenario in which a user equipment and eNodeB may use a carrier 51 licensed to the cellular network operator and radio resources in unlicensed carriers 53-57. The unlicensed carriers 53-57 may be located in a LTE-U frequency band 52.

The licensed carrier 51 may be used for DL and UL control signalling and data transmissions 56. The unlicensed carriers 53-57 may be used at least for DL data traffic. DL data traffic may be offloaded to the secondary carrier when needed. Radio signal 59 in the unlicensed band 52 may be transmitted at least in the downlink.

Figure 4:
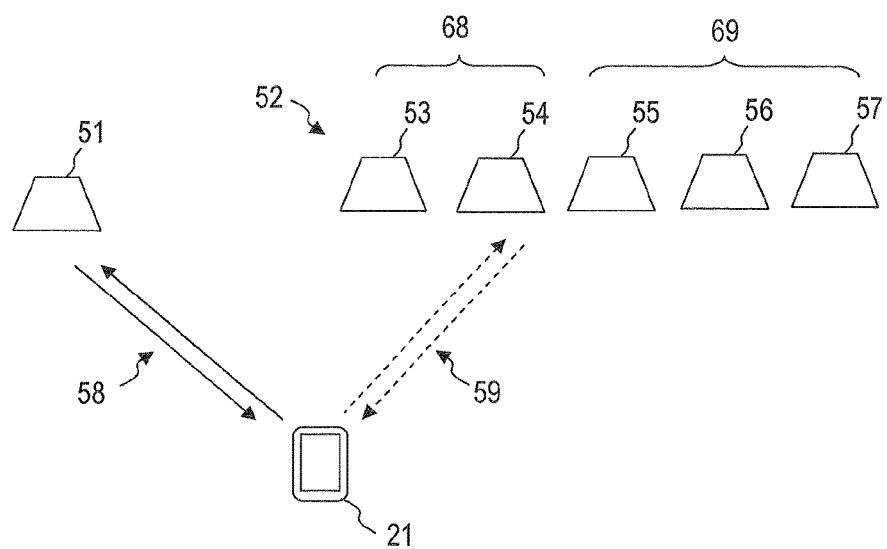
FIG. 4 shows a utilization of unlicensed carriers in a method and system according to an embodiment.

FIG. 4 illustrates a scenario in which the radio resource for the LTE-U data transmission, e.g. a carrier in the LTE-U frequency band 52, may be used at least for UL and DL LTE data traffic. UL and DL data traffic may be offloaded to the secondary carrier when needed. The spectrum in the unlicensed band 52 may be operated in time division duplex (TDD).

The plurality of unlicensed carriers 53-57 may be prioritized by the eNodeB 10. For illustration, a first set 68 of unlicensed carriers may include unlicensed carriers 53, 54 for which interference detected by the user equipments and/or the eNodeB 10 is less than a threshold. A second set 68 of unlicensed carriers may include unlicensed carriers 55-57 for which interference detected by the user equipments and/or the eNodeB 10 in the past exceeds the threshold, at least for certain durations.

The prioritization of unlicensed carriers 53-57 may also define a sequence in which the unlicensed carriers are to be used by the user equipment 21 when the user equipments 21 autonomously switches between different unlicensed carriers.

Figure 5:
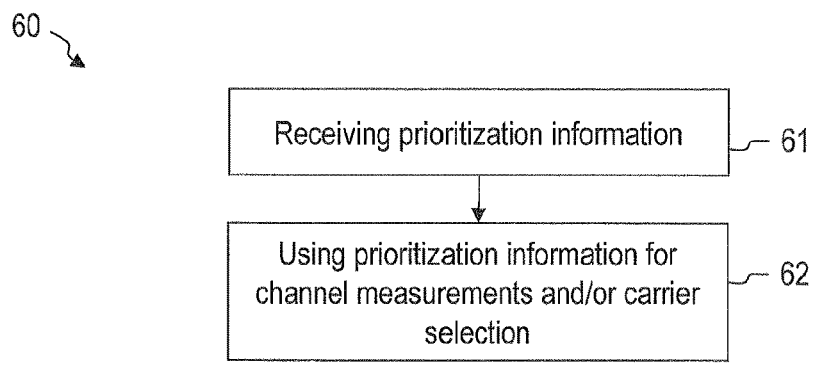
FIG. 5 is a flow chart of a method according to an embodiment.

FIG. 5 is a flow chart of a method 60 according to an embodiment. The method 60 may be performed by the user equipment according to an embodiment.

At 61, the user equipment received prioritization information for a plurality of unlicensed carriers. The prioritization information may be included in a SIB. The prioritization information may be received on a licensed carrier which is licensed to the cellular network operator.

At 62, the user equipment uses the prioritization information for LAA. The user equipment may use the prioritization information for LAA channel measurements.

LAA may be used for defining, by the eNodeB over a licensed carrier, one or several unlicensed carriers for which channel measurements are started in an event-triggered manner.

Alternatively or additionally, the user equipment may use the prioritization information for unlicensed carrier switching. LAA may be used for defining, by the eNodeB over a licensed carrier, an order in which the unlicensed carriers are to be used.

Figure 6:
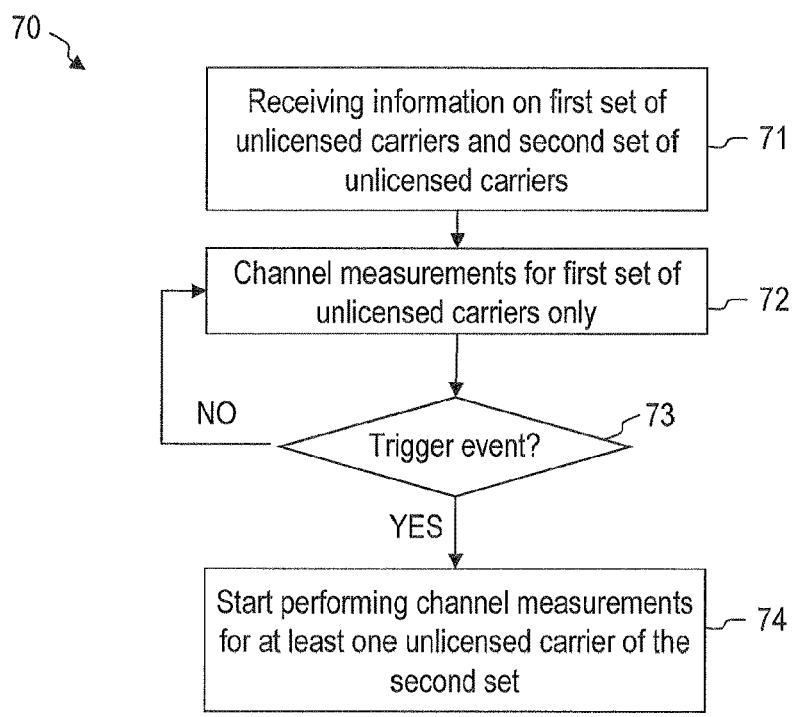
FIG. 6 is a flow chart of a method according to an embodiment.

FIG. 6 is a flow chart of a method 70 according to an embodiment. The method 70 may be performed by the user equipment according to an embodiment.

At 71, the user equipment receives information on which unlicensed carriers belong to a first set of unlicensed carriers and which unlicensed carriers belong to a second set of unlicensed carriers. The first set and the second set may be defined by an eNodeB or another cellular network node. The first set may include unlicensed carriers which are less prone to suffering from interference with other SCells or other non-cellular devices. The second set may include unlicensed carriers which are more likely to suffer from interference with other SCells or other non-cellular devices.

More than two sets of carriers may be defined. The sets of carriers may respectively have the format of a list of carriers.

The information on which unlicensed carriers belong to a first set of unlicensed carriers and which unlicensed carriers belong to a second set of unlicensed carriers may be included in a system information block (SIB) transmitted by the eNodeB. The information received at 71 may be included in the SIB which includes configurations of unlicensed carriers or in a SIB which is different from the SIB which includes configurations of unlicensed carriers.

The information which assigns unlicensed carriers to a first set for immediate channel measurements or to a second set for delayed event-triggered channel measurements may be a static or semi-static variable.

The information received at step 71 may have any one of a variety of formats. The information may define, for each one of the plurality of carriers, whether the carrier is included in the first set or in the second set. This may be done in various ways, e.g. by indicating the set on a carrier-by-carrier basis for each one of the plurality of unlicensed carriers or by grouping carrier identifiers depending on the set to which the respective unlicensed carriers are assigned.

At 72, the user equipment performs channel measurements for one or several unlicensed carriers in the first set. The channel measurements performed before detection of the trigger event are limited to unlicensed carriers in the first set. Results of channel measurements may be reported by the user equipment to the eNodeB. Reporting may be performed in an event-based manner. The transmission trigger event which triggers transmission of a channel measurement result to the eNodeB will generally be different from the event which triggers the delayed measurements for one or several unlicensed carriers in the second set.

At 73, the user equipment verifies whether a trigger event is detected. The trigger event may be configured in the user equipment by the eNodeB.

For illustration, the trigger event may be detected when a certain unlicensed carrier is configured, deconfigured, activated or deactivated by the eNodeB 10.

Alternatively or additionally, the trigger event may be detected when a number of active unlicensed carriers in the first set is less than a threshold. The threshold may be configured by the eNodeB 10.

Alternatively or additionally, the trigger event may be detected when the number of unlicensed carriers in the first list is less than a threshold and/or that the number of unlicensed carriers in the first list for which no interference from another SCell or a non-cellular device is detected is less than the threshold. The threshold may be configured by the eNodeB 10.

Alternatively or additionally, the trigger event may be detected when a trigger message is received from the eNodeB 10. The trigger message may be a multicast or broadcast message which indicates a group identifier for a group to which the eNodeB 10 has assigned the user equipment 21.

If the trigger event for starting measurements for the second set is not detected at 73, the channel measurements for unlicensed carriers remain limited to unlicensed carriers included in the first set at 72. If the trigger event is detected, the method proceeds to 74, At 74, the user equipment starts performing channel measurements for one or several unlicensed carriers in the second set. The channel measurements performed after detection of the trigger event include at least one unlicensed carrier in the second set, but may also include one or several unlicensed carriers in the first set. Results of channel measurements may be reported by the user equipment to the eNodeB. Reporting may be performed in an event-based manner. The transmission trigger event which triggers transmission of a channel measurement result to the eNodeB will generally be different from the event which triggers the delayed measurements for one or several unlicensed carriers in the second set.

Figure 7:
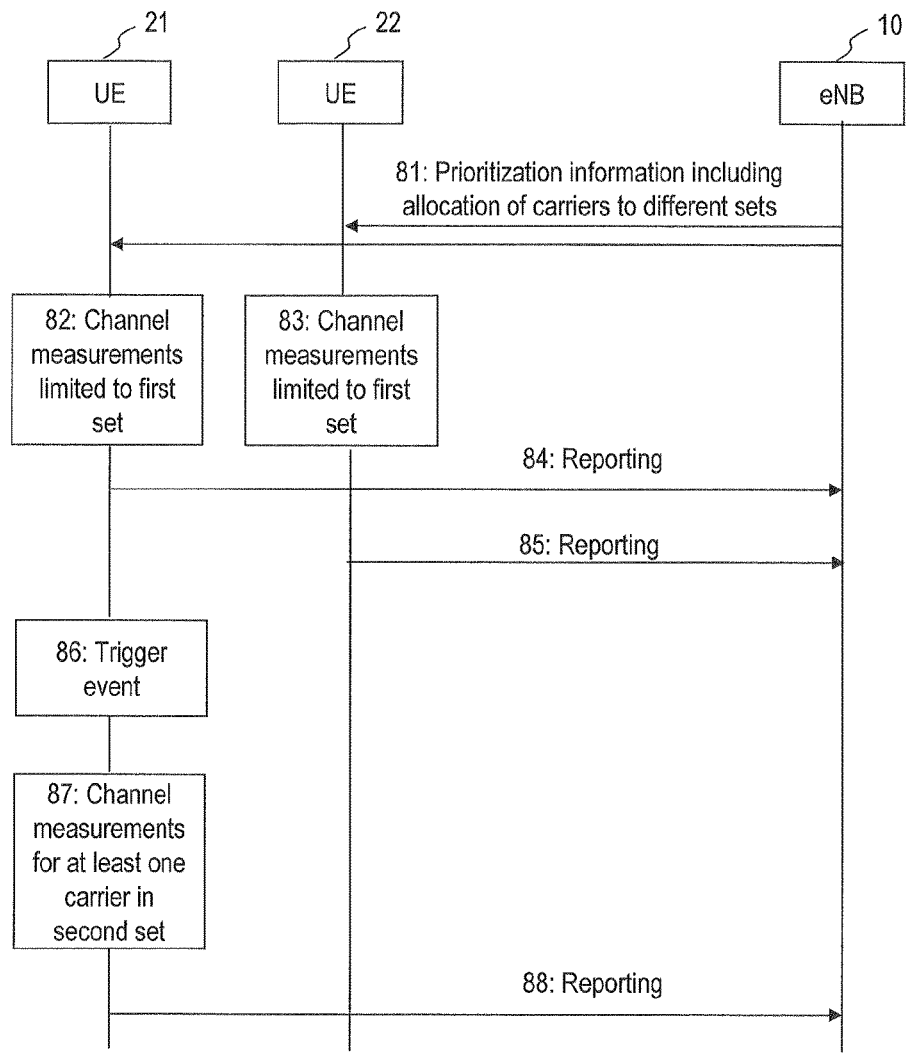
FIG. 7 is a signalling diagram for devices according to embodiments.

FIG. 7 is a signalling diagram for an eNodeB 10 and user equipments 21, 22 according to embodiments.

At 81, the eNodeB 10 may transmit prioritization information. The prioritization information may be included in a SIB. The prioritization information may be included in a SIB which also includes unlicensed carrier configurations. The prioritization information may be broadcast.

The prioritization information may define which unlicensed carriers belong to a first set of unlicensed carriers for which channel measurements are to be performed prior to detection of a trigger event and which unlicensed carriers belong to a second set of unlicensed carriers for which channel measurements are to be started only after detection of the trigger event.

At 82 and 83, the user equipments 21, 22 may perform channel measurements. The channel measurements may detect RX power in unlicensed carriers of the first set, noise in unlicensed carriers of the first set or other parameters which are suitable for detecting interference with other SCells. The channel measurements may be limited to unlicensed carriers which are included in the first set configured by the eNodeB 10 until a trigger event is detected.

At 84 and 85, the user equipments 21, 22 may report channel measurement results to the eNodeB 10. Reporting may be triggered by a transmission trigger event which triggers transmission of a channel measurement result. Reporting may also be implemented in a time-based manner, e.g. by expiry of a timer.

At 86, the user equipment 21 may detect a trigger event. The trigger event may be selected from a group consisting of detecting that a certain key carrier is configured, deconfigured, activated or deactivated; detecting that an active carrier number is less than a certain threshold; detecting that a number of suitable carriers in the first set is less than a certain threshold; detecting a triggering message from the eNodeB.

At 87, in response to detecting the trigger event 86, the user equipment 21 starts performing channel measurements for the unlicensed carriers in the second set. The channel measurements may detect RX power in unlicensed carriers of the second set, noise in unlicensed carriers of the second set or other parameters which are suitable for detecting interference with other SCells.

At 88, the user equipment 21 may report channel measurement results including those obtained for the unlicensed carriers in the second set to the eNodeB 10. Reporting may be triggered by a transmission trigger event which triggers transmission of a channel measurement result. Reporting may also be implemented in a time-based manner, e.g. by expiry of a timer.

Figure 8:
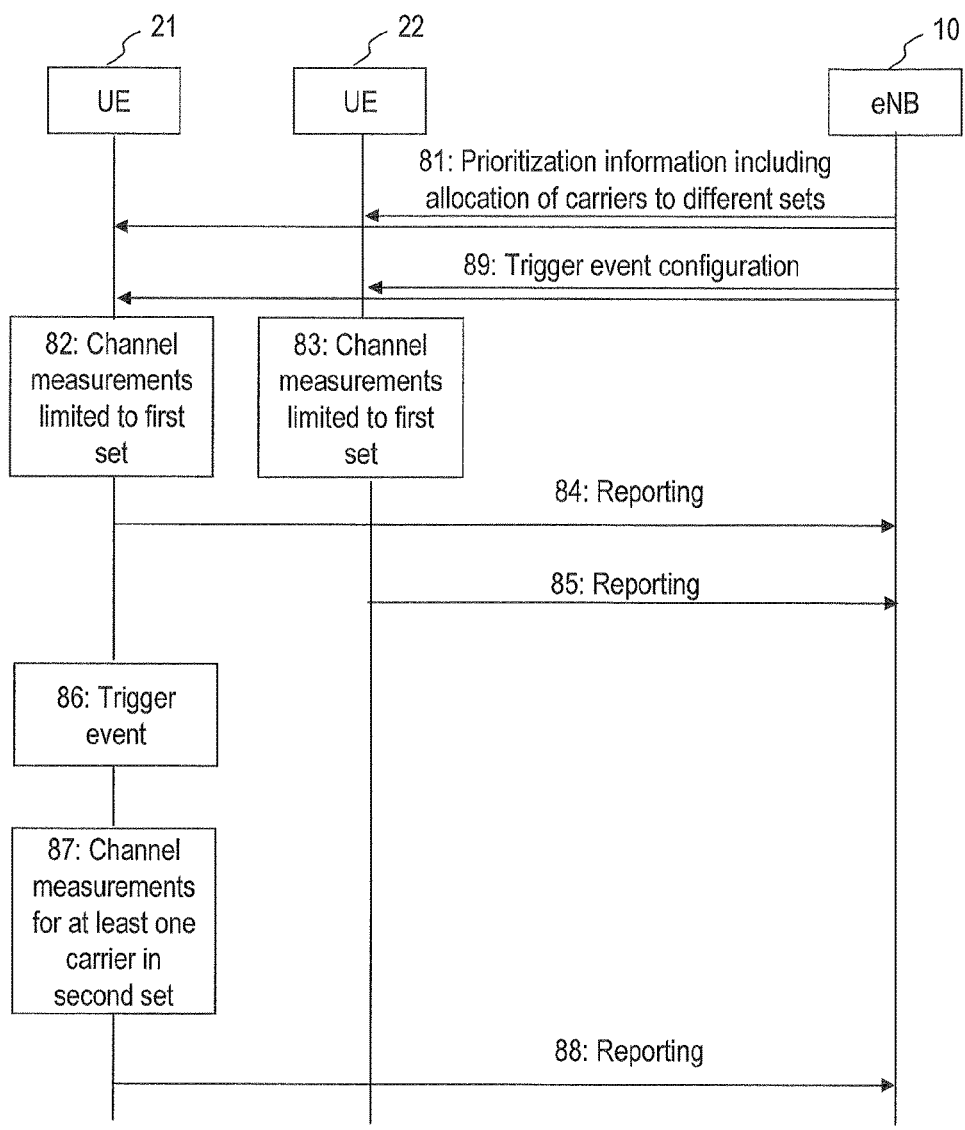
FIG. 8 is a signalling diagram for devices according to embodiments.

FIG. 8 is a signalling diagram for an eNodeB 10 and user equipments 21, 22 according to embodiments.

In the signalling illustrated in FIG. 8, the eNodeB 10 and the user equipments 21, 22 are operative such that the trigger event which is monitored to start the delayed channel measurements for the unlicensed carriers in the second set is also configured by the eNodeB 10.

At 89, the eNodeB 10 may configure the trigger event in the user equipments 21, 22. The eNodeB 10 may use dedicated signalling or a multicast message to configure the trigger event which triggers the delayed channel measurements for the unlicensed carriers. The trigger event may be selected from a group consisting of detecting that a certain key carrier is configured, deconfigured, activated or deactivated; detecting that an active carrier number is less than a certain threshold; detecting that a number of suitable carriers in the first set is less than a certain threshold; detecting a triggering message from the eNodeB.

Additionally or alternatively to defining unlicensed carriers for which the channel measurements may be delayed to reduce complexity, signalling overheads, and terminal power consumption, the prioritization of unlicensed carriers may also define an order in which the unlicensed carriers are to be used by a user equipment. The prioritization information may be provided in a multicast or broadcast message. The user equipments may switch between unlicensed carriers in accordance with an order defined by the prioritization information, without dedicated signalling prior to the carrier switching.

Figure 9:
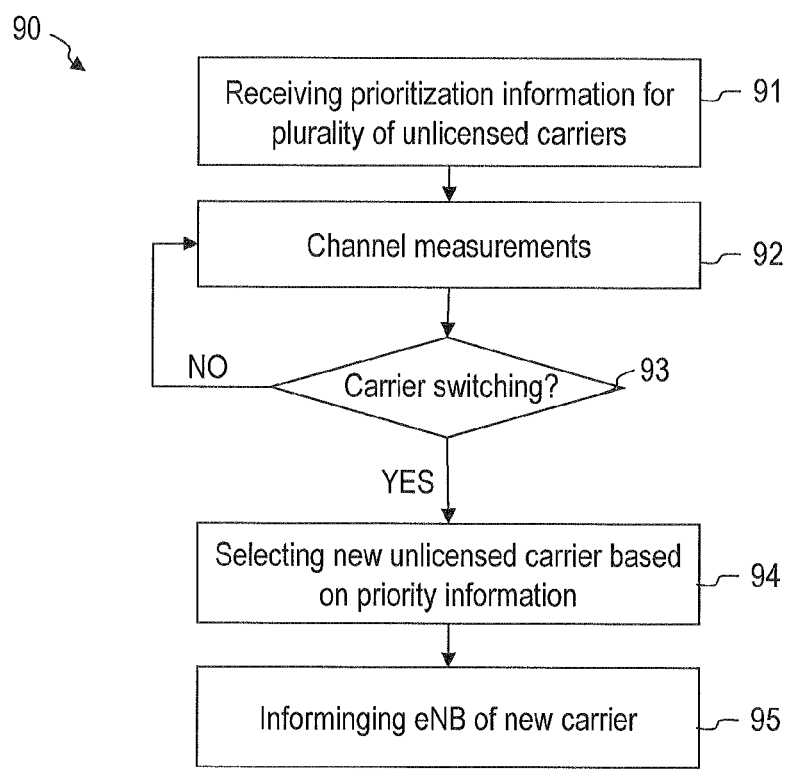
FIG. 9 is a flow chart of a method according to an embodiment.

FIG. 9 is a flow chart of a method 90 according to an embodiment. The method 90 may be performed by the user equipment according to an embodiment.

At 91, the user equipment may receive prioritization information for a plurality of unlicensed carriers. The prioritization information may define which unlicensed carriers are preferred. The prioritization information may be broadcast by the eNodeB. The prioritization of unlicensed carriers may be set based on channel measurements performed by the eNodeB and/or the user equipments. The prioritization information may be received over a licensed carrier.

The prioritization information defining the sequence in which unlicensed carriers are to be used may have various formats. For illustration, the prioritization information may include unlicensed carrier identifiers in a sequence, which defines the order in which the unlicensed carriers shall be used. The prioritization information defining the sequence in which the unlicensed carriers are to be used may be included in a SIB which also defines carrier configurations.

At 92, the user equipment may perform channel measurements for one or several unlicensed carriers. The channel measurements may be delayed for some unlicensed carriers, as explained with reference to FIG. 1 to FIG. 8 above. The channel measurements may be performed at least for a presently used unlicensed carrier.

At 93, the user equipment may determine whether an unlicensed carrier which is used by the user equipment is to be changed. Any one of a variety of criteria may be evaluated. For illustration, the user equipment may determine whether the channel measurement for the presently used unlicensed carrier indicates an interference which is above a threshold. The interference may be quantified by RX power, noise, or other parameters determined for the unlicensed carrier in the receive path of the user equipment. Alternatively or additionally, the user equipment may determine whether the eNodeB intends to enter a DTX mode for an unlicensed carrier. If no carrier switching is to be performed, the channel measurement may be continued at 72 at least for the presently active unlicensed carrier.

At 94, if a carrier switching is to be performed, the user equipment may change to the unlicensed carrier which is the next in accordance with the prioritization information received at 91.

At 95, the user equipment may inform the eNodeB that it performed the carrier switching. Information on the new unlicensed carrier that is being used does not need to be included in the message transmitted to the eNodeB, because the eNodeB is aware of the sequence of unlicensed carriers as defined by the prioritization information. The user equipment may transmit the information on the carrier switching over a licensed carrier.

LAA may thereby be used for performing autonomous switching of unlicensed carriers by a user equipment. The eNodeB may pre-configure carrier priority levels, to thereby define a certain carrier switch order. This information may be sent together with the configuration of all candidate unlicensed carriers to the user equipment.

When a current active carrier experiences interference which exceeds a certain threshold for a certain duration, the user equipment may autonomously switch to the next unlicensed carrier according to the prioritization information and may inform eNodeB of the carrier switching, using an uplink licensed carrier for informing the eNodeB.

When the eNodeB wants to enter DTX state in a certain unlicensed carrier, it will inform the user equipment. The user equipment may switch to the next unlicensed carrier according to the prioritization information.

The sequence in which unlicensed carriers are to be used, as indicated by the prioritization information, may be updated according to channel measurement results. The channel measurement results may be obtained by measurements performed at the eNodeB and/or by measurements reported to the eNodeB by the user equipment(s).

Figure 10:
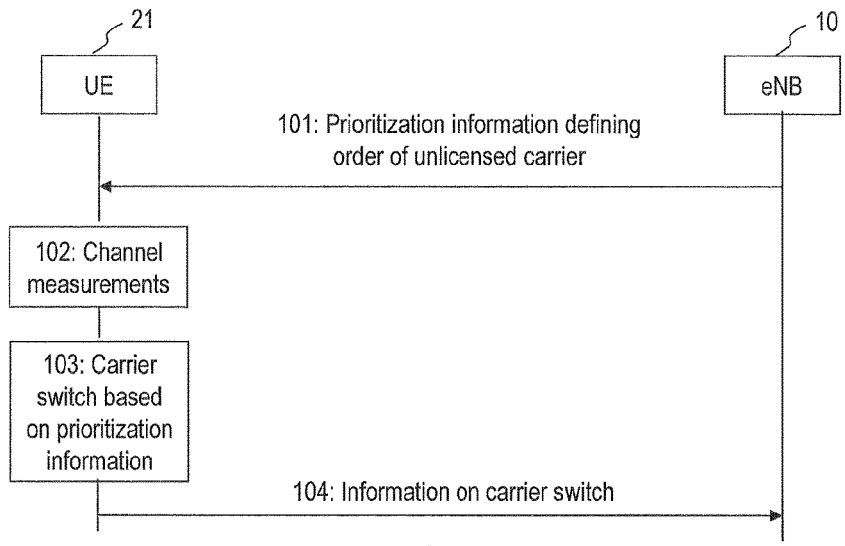
FIG. 10 is a signalling diagram for devices according to embodiments.

FIG. 10 is a signalling diagram for an eNodeB 10 and a user equipment 21 according to embodiments.

In the signalling illustrated in FIG. 10, the eNodeB 10 and the user equipment 21 are operative such that an order in which the user equipment may switch between unlicensed carriers is pre-configured by the eNodeB 10.

At 101, the user equipment may receive prioritization information for a plurality of unlicensed carriers. The prioritization information may define which unlicensed carriers are preferred. The prioritization information may be broadcast by the eNodeB 10. The prioritization of unlicensed carriers may be set based on channel measurements performed by the eNodeB 10 and/or the user equipments. The prioritization information may be received over a licensed carrier. The prioritization information may define the sequence in which unlicensed carriers are to be used by the user equipment.

At 102, the user equipment 21 may perform channel measurements for one or several unlicensed carriers. For at least some unlicensed carriers which are configured by the eNodeB 10, the user equipment 21 may delay the channel measurements as previously explained.

At 103, the user equipment 21 may switch to another unlicensed carrier. The carrier switching may be performed without requesting prior authorization from the eNodeB 10. The carrier switching may be an autonomous process which uses the pre-configured sequence in which unlicensed carriers are to be used, as indicated by the prioritization information received in 101.

At 104, the user equipment 21 may inform the eNodeB 10 that the user equipment 21 has switched to another unlicensed carrier. The information that the carrier switching has taken place may be transmitted over an UL licensed carrier.

Figure 11:
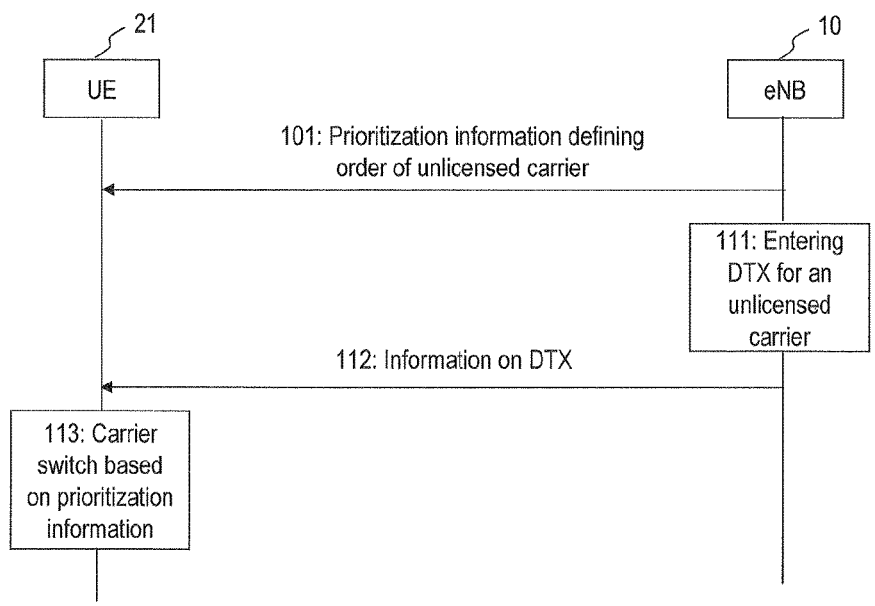
FIG. 11 is a signalling diagram for devices according to embodiments.

FIG. 11 is a signalling diagram for an eNodeB 10 and a user equipment 21 according to embodiments.

In the signalling illustrated in FIG. 11, the eNodeB 10 and the user equipment 21 are operative such that an order in which the user equipment may switch between unlicensed carriers is pre-configured by the eNodeB 10.

At 101, the user equipment may receive prioritization information for a plurality of unlicensed carriers as explained with reference to FIG. 9 and FIG. 10.

At 111, the eNodeB 10 intends to enter a DTX mode for an unlicensed carrier.

At 112, the user equipment 21 is informed that the eNodeB 10 intends to enter the DTX mode for an unlicensed carrier. The signal 112 may be transmitted over a licensed carrier.

At 113, the user equipment 21 may switch to another unlicensed carrier. The carrier switching may be performed without requesting prior authorization from the eNodeB 10. The carrier switching may be an autonomous process which uses the pre-configured sequence in which unlicensed carriers are to be used, as indicated by the prioritization information received in 101.

The eNodeB and user equipment according to embodiments may be configured in such a way that carrier switching for unlicensed carriers may be controlled in a group-wise manner. To this end, the eNodeB itself may perform channel measurements to detect possible interference for a plurality of unlicensed carriers. Alternatively or additionally, user equipments may report channel measurements to the eNodeB. The performance and reporting of channel measurements may be implemented in such a way that channel measurements are delayed for some unlicensed carriers configured by the eNodeB until detection of a trigger event.

Different user equipments may be assigned to the same group or to different groups, depending on the channel measurements performed by the user equipments and/or the eNodeB.

Signalling overheads may be kept small by using multicasting to implement a group carrier switch operation in which several user equipments assigned to the same group change to another unlicensed carrier in accordance with the multicast message. Dedicated signalling may be used to overwrite group based signalling.

Figure 12:
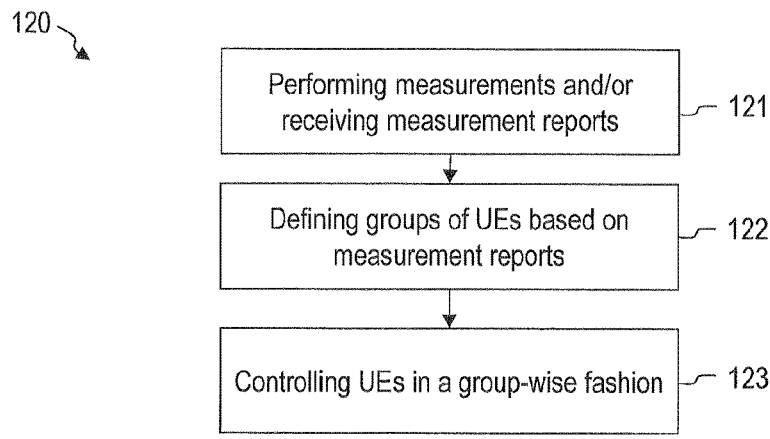
FIG. 12 is a flow chart of a method according to an embodiment.

FIG. 12 is a flow chart of a method 120 according to an embodiment. The method 120 may be performed by an eNodeB or another cellular network node according to an embodiment.

At 121, the eNodeB may perform channel measurements for one or several unlicensed carriers. Alternatively or additionally, the eNodeB may receive channel measurement reports for unlicensed carriers from user equipments.

At 122, the eNodeB may assign user equipments to groups. This may be done in various ways. If the eNodeB detects a SCell which causes interference and/or non-cellular devices which cause interference in the unlicensed carriers, the eNodeB may assign all user equipments in its coverage area to the same group. Alternatively or additionally, the eNodeB may assign the user equipments to the same group if they report RX power or noise for the same unlicensed carriers, for example. User equipments may be assigned to different groups if the reported channel measurements for the unlicensed carriers do not match, i.e., if the user equipments experience interference for different unlicensed carriers.

At 123, the eNodeB may control carrier switching or other LAA functions in a group-wise manner. The eNodeB may transmit a multicast message to a group to cause all user equipments in the group to perform a carrier switching in accordance with the multicast message. Signalling overhead may be reduced thereby.

Figure 13:
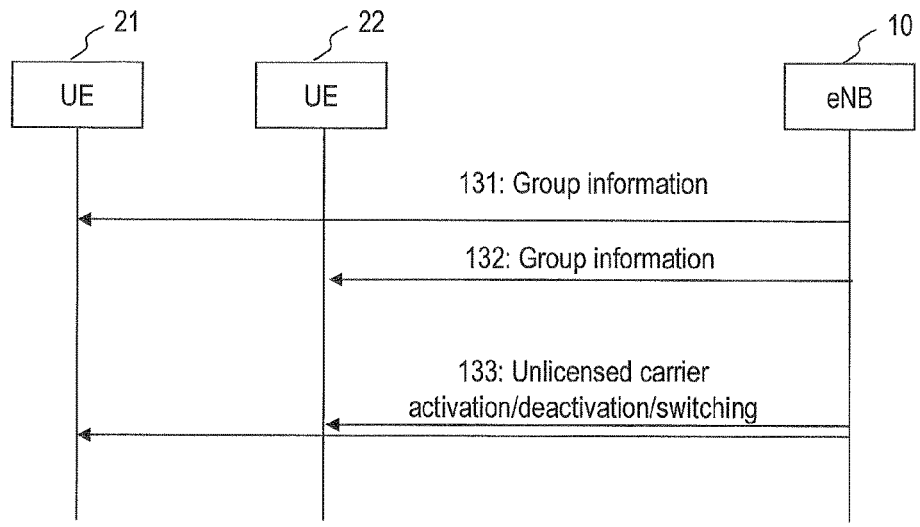
FIG. 13 is a signalling diagram for devices according to embodiments.

FIG. 13 is a signalling diagram for an eNodeB 10 and user equipments 21, 22 according to embodiments for implementing a group based control in LAA.

At 131, 132, the eNodeB 10 may inform the user equipments 21, 22 of the group to which they are assigned. Signalling on a licensed DL carrier may be used to inform the user equipments 21, 22 of the group to which they are assigned.

At 133, the eNodeB transmits a multicast message to control all user equipments of the same group to cause a carrier switching or to enter a discontinuous reception (DRX) mode. The multicast message 133 may be transmitted over a licensed carrier.

Grouping information may be provided in various ways. For illustration, MAC control elements may be used to define the grouping information.

Figure 14:
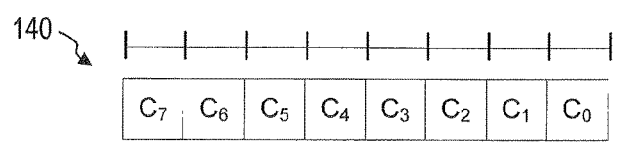
FIG. 14 illustrates information elements for implementing a group-wise LAA.

FIG. 14 illustrates a MAC control element for indicating a group. A MAC control element as illustrated in FIG. 14 may be used when transmitting a multicast message to control a group of user equipments to perform carrier switching for an unlicensed carrier and/or to enter into a DRX mode.

The eNodeB may transmit a multicast message 133 to cause all user equipments of a group to switch carrier, thereby implementing a common SCell activation or deactivation command. The command 133 may be transmitted in the Physical Downlink Shared Channel (PDSCH), for example.

The MAC control element 140 includes a plurality of fields. Each one of the plurality of fields may be assigned to the same group of user equipments, i.e., to the same SCell. By setting the fields $C_i$ of the MAC control element to different values, the eNodeB may indicate to which group(s) of user equipments the command is applicable.

Each user equipment which participates in the LAA may store the information which indicates to which group this user equipment belongs. In response to receiving a command having the MAC control element 140, the user equipment may determine based on the settings of the fields $C_i$ whether the command applies to the user equipment because it is directed to the group to which the user equipment belongs, or whether the user equipment may ignore this command.

Other configurations may be used to indicate group information in a command which is transmitted as multicast command by an eNodeB.

Figure 15:
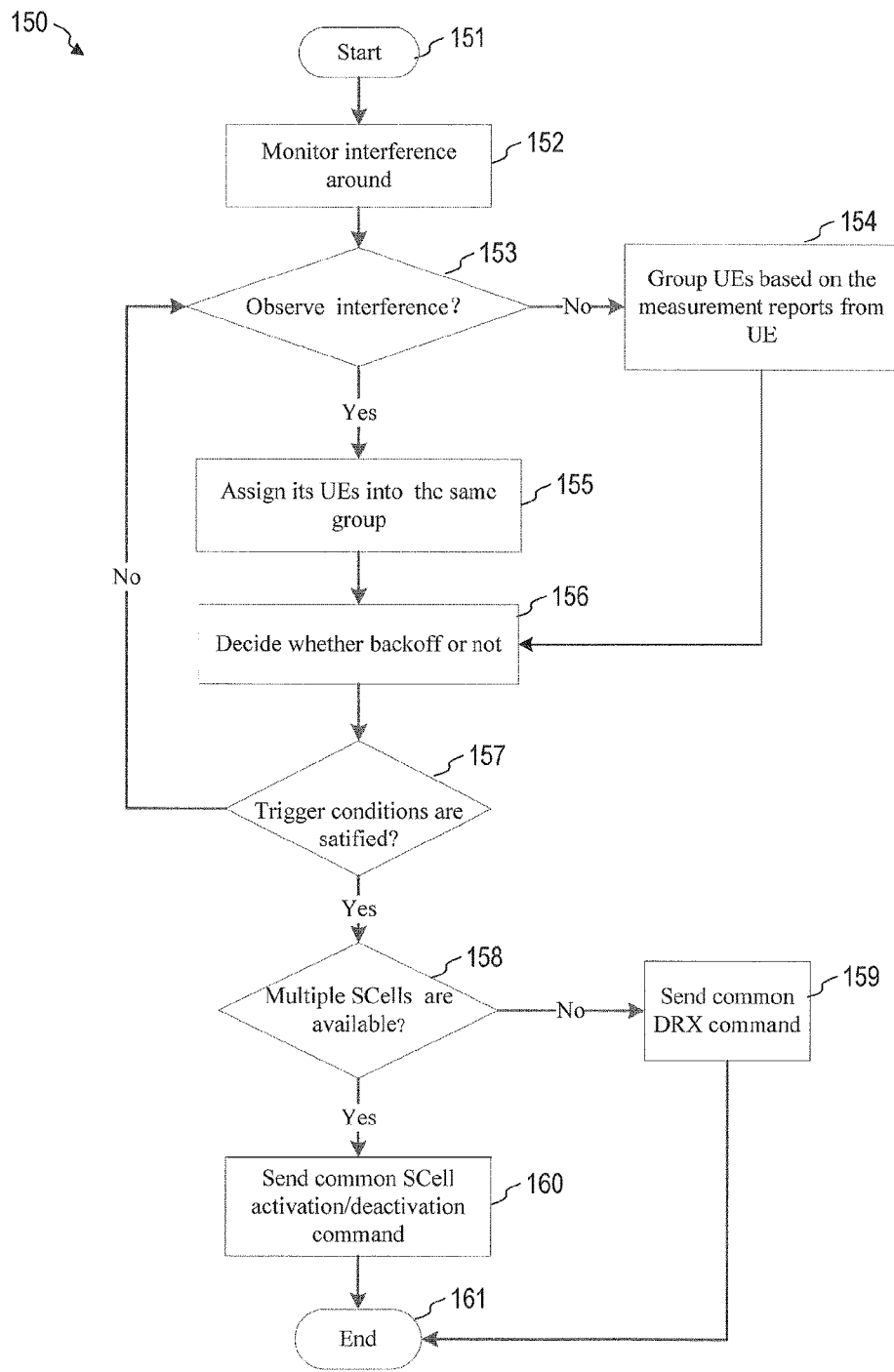
FIG. 15 is a flow chart of a method according to an embodiment.

FIG. 15 is a flow chart of a method 150 which may be performed by an eNodeB according to an embodiment. In the method, grouping may be performed based on channel measurements which are capable of detecting interference. In the method, the eNodeB may optionally enter a DTX state and may implement a group-based control for LAA.

The method starts at 151.

At 152, the eNodeB may perform channel measurements for unlicensed carriers to detect interference. The eNodeB may detect the presence of one or several interfering WiFi devices, WLAN access points or other devices which may compete for resources in the unlicensed carriers.

At 153, it is determined whether the eNodeB itself detects interference in unlicensed carriers. If the eNodeB itself does not detect interference in unlicensed carriers, the method proceeds to 154.

At 154, the user equipments may be grouped in accordance with channel measurements performed by the user equipments. For this purpose, the eNodeB may define different sets of unlicensed carriers configured in the user equipments. The eNodeB may define at least a first set and a second set of unlicensed carriers, with the channel measurements being delayed by the user equipments for the unlicensed carriers of the second set as described above. The eNodeB may also configure other prioritization information, such as an order in which unlicensed carriers are to be used by user equipments.

The eNodeB may compare the measurement results for unlicensed carriers reported by different user equipments. If the measurement results reported from several user equipments show that there is no interference from the other SCells or from other non-cellular devices, then these user equipments are assigned into one group. If the measurement results reported from several user equipments show that their interferences all come from the same source, e.g. from the same SCell or from the same WiFi device, then these user equipments may be assigned to one group. Grouping information is stored in the eNodeB.

The eNodeB may inform the user equipments of the groups to which they are assigned. The user equipments may use dedicated signalling, e.g. Radio Resource Control (RRC) signalling for this purpose. For illustration, the eNodeB may sent the group identifier as G-RNTI and Cell Radio Network Temporary Identity (C-RNTI) of the user equipments in an RRC connection Reconfiguration message to different values, in accordance with the group to which these user equipments have been assigned.

The method may continue at 156.

At 155, if the eNodeB itself detects interference in unlicensed carriers, it may assign all user equipments served by the eNodeB to the same group. The eNodeB may inform the user equipments of the groups to which they are assigned. The user equipments may use dedicated signalling, e.g. Radio Resource Control (RRC) signalling for this purpose. For illustration, the eNodeB may send the group identifier as G-RNTI and Cell Radio Network Temporary Identity (C-RNTI) of the user equipments to the same value in an RRC connection Reconfiguration message.

Steps 156-160 may be performed in combination with or separately from steps 151-155.

At 156, the eNodeB may determine whether it is to enter a DTX state, so as to back off. For illustration, if the eNodeB detects WiFi beacon signals or usage of unlicensed carriers by other SCells, the eNodeB may decide to back off. Scheduling algorithms and strategies may be implemented to take the decision on whether the eNodeB is to back off. The scheduling algorithm may consider the duration for which the eNodeB and other systems occupy unlicensed carriers, priorities among systems or other criteria. The scheduling algorithm may also consider coordination mechanism. For illustration, different LAA operators may coordinate with each other.

If the eNodeB decides to back off, it enters into an DTX state. The corresponding SCell can be used by other systems such as WiFi or by other cellular network operators.

If the eNodeB decides not to back off, it may continue using the unlicensed carriers.

By such a mechanism, the eNodeB may keep the unlicensed carriers free for use by other systems, such as other LTE SCells, WiFi devices or WLAN access points if there are conflicts in usage of unlicensed carriers. The eNodeB may use the unlicensed carriers if there is no interference, for example. For illustration, if the eNodeB detects that there is no interference in unlicensed carriers caused by other SCells or other non-cellular devices, the eNodeB may start using unlicensed carriers again for data offloading, for example.

At 157, the eNodeB determines whether a trigger condition for entering DTX in unlicensed carriers is satisfied. If the trigger condition is not satisfied, the method may return to 153. If the trigger condition is satisfied, the eNodeB may take different actions depending on whether different SCells can be used or not. For illustration, if there is an SCell configured for which the unlicensed carriers do not evidence any interference, the eNodeB may cause the user equipments in one group or several groups to perform carrier switching. Thereby, unlicensed carriers for which there is no interference is detected may be used. If there is only one SCell available, the eNodeB may cause the user equipments to enter DRX mode for the unlicensed carrier when the eNodeB enters DTX mode.

At 158, the eNodeB may determine whether several SCells are available. If there are not several SCells available, the method proceeds to 159. At 159, the eNodeB may multicast a DRX command. The DRX command may instruct the user equipments in a group to enter DRX mode for an unlicensed carrier. As explained above, this may cause the user equipment to select another unlicensed carrier in accordance with prioritization information configured in the user equipments by the eNodeB. The DRX command may be sent by the eNodeB in the PDSCH channel. A MAC control element may indicate the group(s) of user equipments which are to stop using the respective unlicensed carrier. The method may terminate at 161.

At 160, if the eNodeB determines that several SCells are available, the eNodeB may send a common SCell activation/deactivation command to several user equipments. The common SCell activation/deactivation command may be a multicast message. The common SCell activation/deactivation command may be transmitted in the PDSCH channel. The common SCell activation/deactivation command may include a MAX information element structured as explained with reference to FIG. 14, to indicate which SCells are to be activated or deactivated. Control over usage of unlicensed carriers may thereby be implemented in a group wise manner. The method may terminate at 161.

Figure 16:
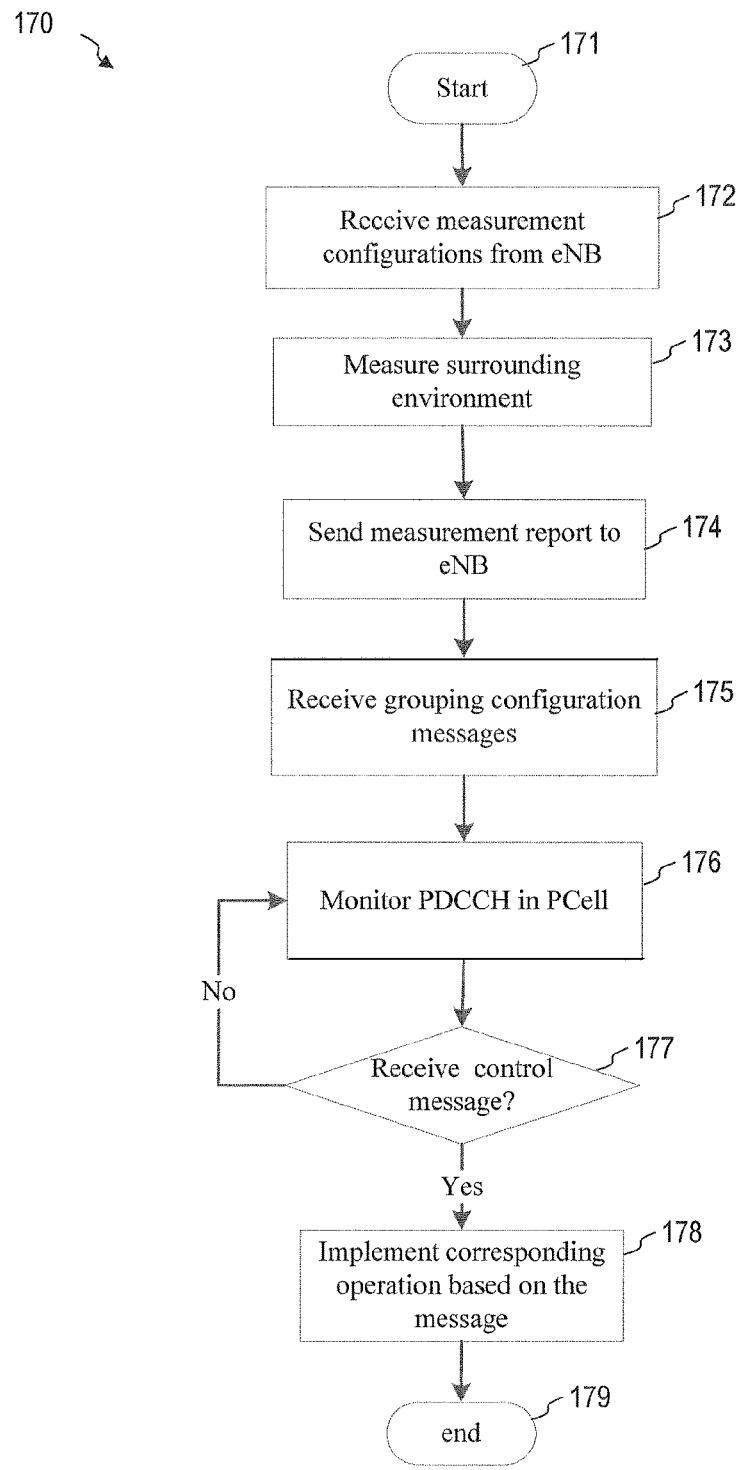
FIG. 16 is a flow chart of a method according to an embodiment.

FIG. 16 is a flow chart of a method 170 which may be performed by a user equipment according to an embodiment.

The method starts at 171.

At 172, the user equipment may receive a measurement configuration from the eNodeB. The measurement configuration may configure a plurality of unlicensed carriers. The measurement configuration may comprise prioritization information. The prioritization information may define different sets of unlicensed carriers, so as to allow channel measurements to be delayed for some unlicensed carriers having lower priority. The measurement configuration may also define a trigger event which causes the user equipment to start performing the channel measurements for unlicensed carriers having lower priority.

At 173, the user equipment may perform channel measurements. A RX power, noise or other parameters quantifying interference in unlicensed carriers may be measured.

The channel measurements may be started for at least some of the unlicensed carriers only in response to detecting the trigger event.

For illustration, the trigger event may be that a certain unlicensed carrier is configured, deconfigured, activated or deactivated by the eNodeB 10.

The trigger event may be that a number of active unlicensed carriers in the first set is less than a threshold. The threshold may be configured by the eNodeB 10.

The trigger event may be that the number of unlicensed carriers in the first list is less than a threshold and/or that the number of unlicensed carriers in the first list for which no interference from another SCell or a non-cellular device is detected is less than the threshold. The threshold may be configured by the eNodeB 10.

The trigger event may be receipt of a trigger message from the eNodeB 10. The trigger message may be a multicast or broadcast message which indicates a group identifier for a group to which the eNodeB 10 has assigned the user equipment 21.

If the user equipment detects interference in an unlicensed carrier, it may switch to another unlicensed carrier as explained in detail with reference to FIG. 9 to FIG. 11.

At 174, the user equipment may send a report on the channel measurements to the eNodeB. The measurement reports may be transmitted over a licensed UL carrier. The measurements reports may be transmitted in response to a transmission trigger event. Examples of transmission trigger events include the strength of interference or the signal quality received from other SCells.

Steps 175-178 may be performed separately from or in combination with steps 171-174.

At 175, the user equipment may receive a grouping configuration message. The grouping configuration message may inform the user equipment of the group to which it was assigned. The grouping information message may be a RRC connection Reconfiguration message. The user equipment may retrieve the group information from the G-RNTI or another information element.

At 176-178, the user equipment may monitor multicast messages to detect whether the eNodeB controls the usage of unlicensed carriers for LAA, using a group-wise control.

At 176, the user equipment may monitor the Physical Downlink Control Channel (PDCCH) to detect multicast messages which are control messages for the group to which the user equipment is assigned. The user equipment monitors the licensed DL carriers, i.e., the primary cell (PCell) to detect the multicast messages.

At 177, it is determined whether the received message in the PDCCH is directed to the group to which the user equipment belongs. This determination may be performed based on the G-RNTI in the received message. The monitoring at 176 may be continued until a control messages for the group to which the user equipment belongs is received.

At 178, in response to receiving a multicast message which is directed to the group to which the user equipment belongs, the user equipment may implement the command provided by the eNodeB in the multicast message.

For illustration, if the control message is a common DRX command, the user equipment may determine whether the common DRX command is directed to the group to which the user equipment belongs. The user equipment may compare the received G-RNTI to the one previously received at 175 and stored in the user equipment. The user equipment may enter DRX mode if the common DRX command is directed to the group to which the user equipment belongs.

For further illustration, if the control message is a common SCell activation/deactivation command, the user equipment may determine whether the common SCell activation/deactivation command is directed to the group to which the user equipment belongs. The user equipment may compare the received G-RNTI to the one previously received at 175 and stored in the user equipment. The user equipment may implement an unlicensed carrier switching to comply with the SCell activation/deactivation command if the command is directed to the group to which the user equipment belongs.

At 179, the method may terminate.

Various effects are attained by the devices, methods and systems according to embodiments. For illustration, the devices, systems and methods may reduce system loads, e.g. signalling overhead, and may reduce complexity when implementing LAA.

While exemplary embodiments have been described with reference to the drawings, modifications may be implemented in other embodiments. For illustration, while specific signalling schemes have been described, other messages and control elements may be used in other embodiments.

Although the invention has been shown and described with respect to certain preferred embodiments, equivalents and modifications will occur to others skilled in the art upon the reading and understanding of the specification. The present invention includes all such equivalents and modifications.

The invention claimed is:

1. A user equipment, comprising:
a wireless interface operative for communication with a cellular communication network,
the user equipment being operative to receive prioritization information for a plurality of unlicensed carriers from a cellular network node,
the user equipment being operative to use the prioritization information for channel measurements, the channel measurements comprising one or several of received power, noise or other parameters which indicate interference,
wherein the prioritization information is used by the user equipment to configure the channel measurements, the configuration defining a first set of unlicensed carriers and a second set of unlicensed carriers which is different from the first set of unlicensed carriers;
the user equipment being operative to
perform the channel measurements for at least one carrier of the first set of unlicensed carriers;
inhibit the channel measurements for at least one carrier of the second set of unlicensed carriers; and
in response to detecting a trigger event, start performing the channel measurements for the at least one carrier of the second set of unlicensed carriers.

2. The user equipment of claim 1,
wherein the user equipment is operative to start reporting the channel measurements for the at least one carrier of the second set of unlicensed carriers in response to detecting the trigger event.

3. The user equipment of claim 1,
wherein the trigger event comprises a threshold comparison of a number of carriers in the first set of unlicensed carriers which are available for communication.

4. The user equipment of claim 1,
wherein the trigger event comprises receipt of a trigger message.

5. The user equipment of claim 4,
wherein the user equipment is operative to receive the trigger message over a licensed carrier.

6. The user equipment of claim 1,
wherein the user equipment is operative to use the priority information to select an active carrier from the plurality of unlicensed carriers.

7. The user equipment of claim 6,
wherein the user equipment is operative to use the priority information for carrier re-selection.

8. The user equipment of claim 6,
wherein the user equipment is operative to transmit information on the selected carrier to the cellular communication network.

9. The user equipment of claim 8,
wherein the user equipment is operative to transmit the information on the selected carrier over a licensed carrier.

10. The user equipment of claim 1,
wherein the user equipment is operative to receive group information from the cellular network node, the group information assigning the user equipment to a group of user equipments,
wherein the user equipment is operative to switch an active carrier selected from the plurality of unlicensed carriers in response to a multicast message from the cellular communication network.

11. The user equipment of claim 1, where the trigger event comprises a spectral characteristic of the first set of unlicensed carriers.

12. The user equipment of claim 1,
wherein the user equipment is operative to configure a trigger event depending on characteristics of the first set of unlicensed carriers.

13. A cellular network node, comprising:
a wireless interface for communication with a user equipment, and
a processing device coupled to the wireless interface and operative to control the wireless interface to transmit prioritization information for a plurality of unlicensed carriers to at least one user equipment,
wherein the prioritization information is used to configure channel measurements, the configuration defining a first set of unlicensed carriers and a second set of unlicensed carriers which is different from the first set of unlicensed carriers, the channel measurements comprising one or several of received power, noise or other parameters which indicate interference,
wherein the prioritization information inhibits performing the channel measurements for at least one carrier of the second set of unlicensed carriers until detection of a trigger event.

14. The cellular network node of claim 13,
wherein the cellular network node is operative to define the first set of unlicensed carriers and the second set of unlicensed carriers based on channel measurements performed by the cellular network node and/or based on channel measurements performed by the user equipment.

15. The cellular network node of claim 13,
wherein the cellular network node is operative
to assign the at least one user equipment to a group of user equipments and
to transmit a multicast message to cause all user equipments of the group to switch to another unlicensed carrier.

16. The cellular network node of claim 13,
wherein the cellular network node is operative to preconfigure the trigger event in the at least one user equipment, the trigger event causing the at least one user equipment to start performing the channel measurements for at least one carrier of the second set of unlicensed carriers.

17. A system, comprising:
a cellular network node comprising:
- a network node wireless interface for communication with a user equipment, and
- a processing device coupled to the network node wireless interface and operative to control the network node wireless interface to transmit prioritization information for a plurality of unlicensed carriers to at least one user equipment, the prioritization information used to configure channel measurements, the configuration defining a first set of unlicensed carriers and a second set of unlicensed carriers which is different from the first set of unlicensed carriers, the channel measurements comprising one or several of received power, noise or other parameters which indicate interference; and a user equipment comprising:
- a wireless interface operative to receive prioritization information for a plurality of unlicensed carriers from the cellular network node, the user equipment being operative to use the prioritization information for the plurality of unlicensed carriers to perform channel measurements;

the user equipment further being operative to
- perform the channel measurements for at least one carrier of the first set of unlicensed carriers;
- inhibit the channel measurements for at least one carrier of the second set of unlicensed carriers; and
- in response to detecting a trigger event, start performing the channel measurements for the at least one carrier of the second set of unlicensed carriers.

18. A method of using unlicensed carriers for a cellular communication network, the method comprising
- receiving, by a user equipment, prioritization information for a plurality of unlicensed carriers from a cellular network node; and
- using, by the user equipment, the prioritization information for channel measurements, the channel measurements comprising one or several of received power, noise or other parameters which indicate interference,
- wherein the prioritization information is used by the user equipment to configure the channel measurements, the configuration defining a first set of unlicensed carriers and a second set of unlicensed carriers which is different from the first set of unlicensed carriers, and
- wherein using the prioritization information for channel measurements comprises:
  - performing the channel measurements for at least one carrier of the first set of unlicensed carriers;
  - inhibiting the channel measurements for at least one carrier of the second set of unlicensed carriers; and
  - in response to detecting a trigger event, starting to perform the channel measurements for at least one carrier of the second set of unlicensed carriers.

* * * * *